Jan. 8, 1935.   B. H. URSCHEL   1,986,949
TUBULAR AXLE BEARING CONSTRUCTION
Filed Nov. 2, 1931
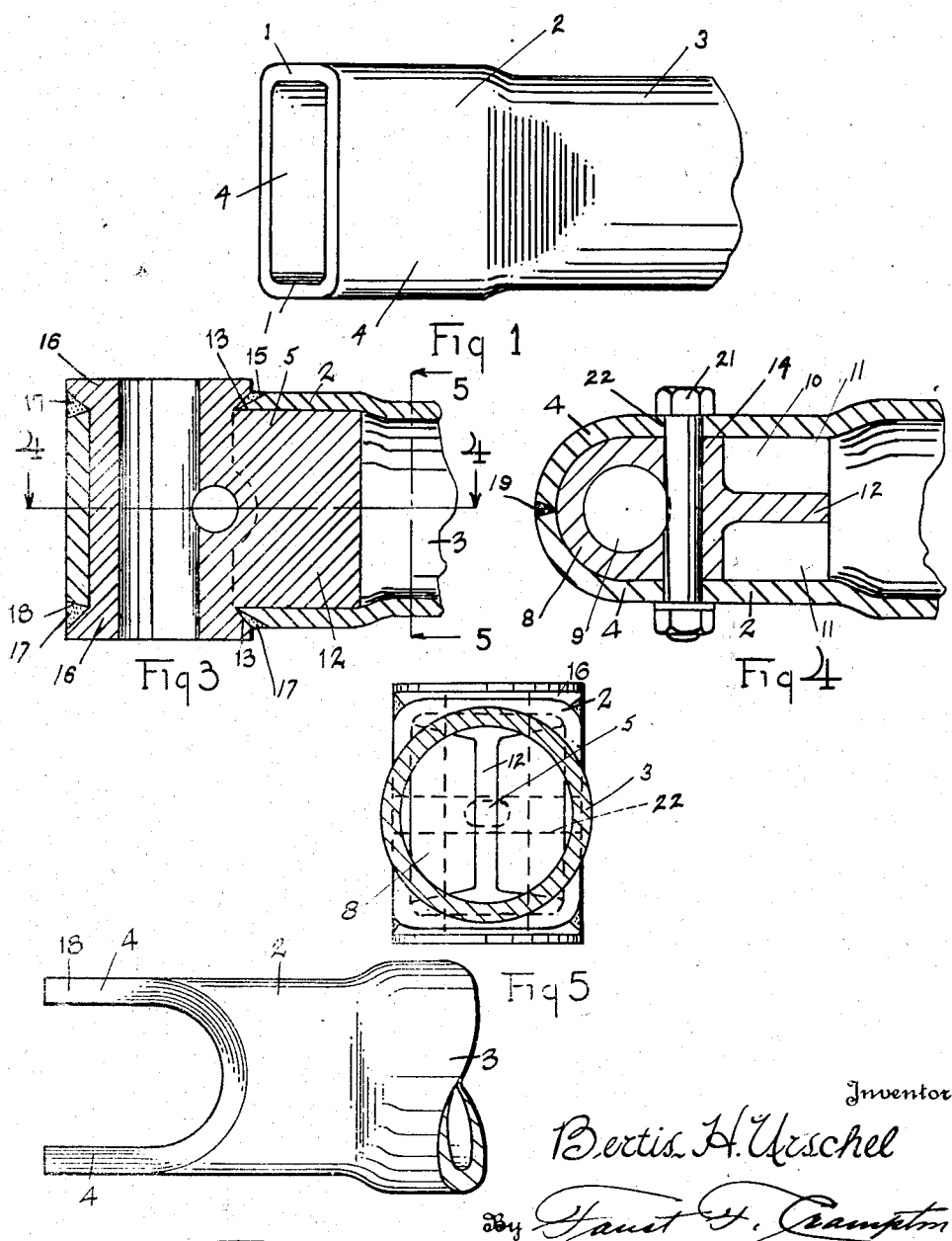
Inventor
Bertis H. Urschel
By Faust F. Crampton
Attorney Patented Jan. 8, 1935

1,986,949

UNITED STATES PATENT OFFICE 1,986,949

TUBULAR AXLE BEARING CONSTRUCTION

Bertis H. Urschel, Bowling Green, Ohio

Application November 2, 1931, Serial No. 572,582

1 Claim. (Cl. 301—124)

My invention has for its object to provide a bearing construction for tubular axles that is particularly advantageous for withstanding stresses and strains that are transmitted through the bearings of axles to which stub axles are connected. The invention particularly has for its object to so construct and connect the bearing part to the body of a tubular axle that it will sustain and transmit the load that is placed upon the axle and will withstand the torque and shearing stresses that occur in the use of axles having stub axle parts.

The invention may be contained in structures of different forms and, to illustrate a practical application of the invention, I have selected an axle containing the invention as an example of the various embodiments of my invention and shall describe the structure selected hereinafter, it being understood that variations therefrom may be made and that certain features of my invention may be used to advantage without a corresponding use of other features, without departing from the spirit of the invention. The particular structure selected is shown in the accompanying drawing.

Fig. 1 is a perspective view of an end part of the tubular axle upon the completion of one of the steps in its formation preparatory to receiving the bearing member. Fig. 2 illustrates a top view of the axle when the end portion, shown in Fig. 1, has been shaped to receive the bearing part of the axle. Fig. 3 illustrates a vertical longitudinal section of the end part shown in Fig. 3. Fig. 4 is a view of a section taken on the plane of the line 4—4 indicated in Fig. 3. Fig. 5 is a view of a section taken on the plane of the line 5—5 indicated in Fig. 3.

In the particular form of construction selected as an example of axles containing my invention, the end parts of a steel tube are formed to have, in each case, a rectangular cross section of the desired dimensions and a wall of the desired thickness by suitable shaping machines, such as by the use of upsetting or swaging machines, or expanded by a suitable expanding or shaping die to produce the desired amount of metal within the walls and the desired rectangular dimensions of the end portions in which the bearing members are to be located. The upper and lower walls 1 of the rectangular-formed end part 2 of the axle 3 are bored in the plane of the axis of the body of the axle and portions of the walls 1, between the ends of the axle, and the opening thus formed may be cut away to leave protruding parts of the side walls 4 of the axle, substantially as shown in Fig. 2. Bearing members 5 are then forced into each end of the axle.

The bearing members 5 may be made of forged steel. They have, preferably, substantially semi-cylindrical parts 8. Each bearing member 5 is bored, as at 9, for receiving the bearing member of the stub axle, such as the king pin of the stub axle. The bearing member 5 is also preferably provided with a protruding part 10 that conforms to an I beam construction. The part 10 has upper and lower flanges 11 and a web 12 and fits into the rectangular-formed end 2 of the axle at the rear of the slotted opening that is formed in the upper end lower walls of the end portion of the axle. The top and bottom portions of the flanges 11 of the I-beam shaped portion fit the inner surfaces of the top and bottom walls of the tubular member. When the axle is assembled, the flanges resistingly flex upon cooling and maintain a tight fit within the rectangular ends. The web 12 is located at right angles to the top and bottom walls of the axle and in the plane of the axis of the opening 9 for receiving the king pin of the stub axle bearing, which provides the maximum resistance to bending in the plane of the stub axle by the structure supported thereby. The I beam parts of the bearing members operate to reenforce the end parts of the axle and the bearing members and to increase the area of contact between the tubular axle and the bearing members through which the pressures are transmitted between the stub axles and the main axle. The tubular member completely surrounds the bearing member and affords a maximum weight resisting and torque resisting shape, while the I-beam shape of the reenforcing member affords a maximum load sustaining member at a point which is ordinarily the weakest in axle construction and the two, the I-beam and cylindrical-shaped parts, combine to produce an exceedingly rigid, durable, light-weight structure at this point.

The rectangular end portion 2 of the axle has a length sufficient to receive and fit about the inwardly extending parts of the bearing member 5 and enable the protruding portions of the side walls 4 that extend beyond the openings that are bored in the upper and lower walls 1 to be wrapped, or rolled, into contact with the semi-cylindrical part 8 of the bearing member 5 and thus to enclose the bearing member within the metal of the body of the axle.

The bearing member has upper and lower protruding portions 16 that protrude substantially the thickness of the metal of the end portion 2 of the body of the axle. The upper and lower ends of the semi-cylindrical part of the bearing member preferably protrude from the upper and lower surfaces of the walls 1 of the end portions 2 of the axle to give clearance between the stub axle yoke or other means for connecting the stub axle to the end of the main axle. The protruding portions 16 of the bearing member, preferably, have beveled surfaces, as at 13, and the edges of the openings formed in the upper and lower walls 1, of the end portion 2, are beveled as at 15, while the edges of the portions of the side walls 4, located between the ends of the side wall and the opening formed in the upper and lower walls 1, may be beveled, as at 18. Thus, the beveled edges of the protruding part 16 overhang edge portions of the rectangular end part of the end of the axle and may be welded along the beveled edges at the point of juncture between the ends of the side walls, where they are brought contiguous to each other on the outer side of the bearing member, substantially as indicated at 17 and 19 in Figs. 3 and 4 of the drawing.

Preferably, the bearing member 5 is provided with a key bolt 21 for keying a king bolt that may be inserted in the bearing member. The key bolt 21 extends through an opening 22 that may be bored through the side walls 4 of the end of the axle and the bearing member 5 so that the surfaces of the openings 9 and 22 will intersect. When, therefore, a stub axle king pin is inserted in the opening 9, it may be locked or keyed in position by means of the bolt 21. The king pin may be slotted at the point that it is engaged by the bolt 21 to lock it from longitudinal movement within the opening 9, in the manner well known in the art.

Thus, by my invention, I have provided a means for transmitting stresses and strains over large areas within the ends of the axle which greatly increases the resistance of the axle to the stresses that axles are ordinarily subjected to in use.

I claim:

In a tubular axle having a substantially rectangular end portion, the top and bottom walls having slots cut therein, a bearing member having a cylindrical part at one end, and a protruding I-beam shaped portion extending from the cylindrical part, the outer surfaces of the flanges of the I-beam shaped portion, and their edges fitting the inner surfaces of the top and bottom walls and the inner upper edge portions of the sides of the rectangular end portion, the stress supporting web extending substantially through the axis of the end of the axle and located in the plane of the axis of the cylindrical part whereby the elastic flanges resistingly flex upon cooling of the wall of the tubular axle to maintain a tight fit within the rectangular end portion.

BERTIS H. URSCHEL.